J. B. UNDERWOOD.

Cotton-Choppers and Cultivators.

No. 5,741. Reissued Jan. 27, 1874.

Witnesses:
G. Mathys
Solon C. Kemon

Inventor:
Joseph B. Underwood
PER
Attorneys.

AM. PHOTO-LITHOGRAPHIC Co. N.Y. (OSBORNE'S PROCESS.)

UNITED STATES PATENT OFFICE.

JOSEPH B. UNDERWOOD, OF FAYETTEVILLE, N. C., ASSIGNOR TO EDMUND L. PEMBERTON, JOHN W. HINSDALE, AND MRS. S. C. UNDERWOOD.

IMPROVEMENT IN COTTON CHOPPERS AND CULTIVATORS.

Specification forming part of Letters Patent No. 140,746, dated July 8, 1873; reissue No. 5,741, dated January 27, 1874; application filed November 1, 1873.

*To all whom it may concern:*

Be it known that I, JOSEPH B. UNDERWOOD, of Fayetteville, in the county of Cumberland and State of North Carolina, have invented a new and useful Improvement in Combined Cotton Choppers and Cultivators; and I do hereby declare that the following is a full, clear, and exact description of the same, reference being had to the accompanying drawing, forming a part of this specification.

The invention consists in the improvement of implements for chopping out and cultivating cotton, rice, and other crops, as hereinafter described and pointed out in the claims.

Figure 4:
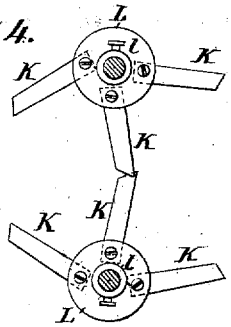
Figure 1:
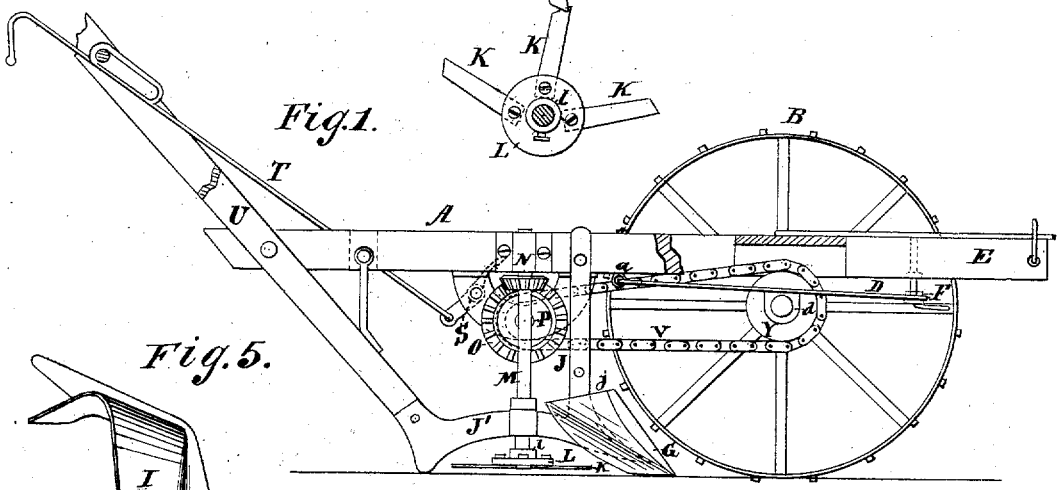
Figure 5:
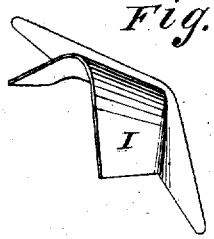
Figure 2:
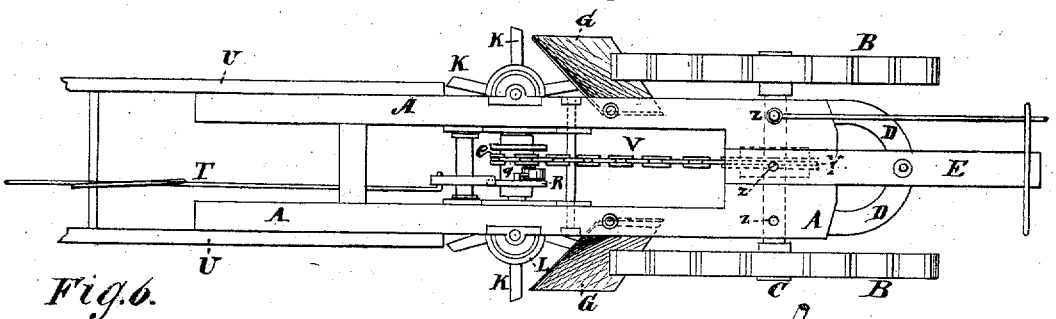
Figure 6:
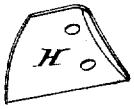
Figure 3:
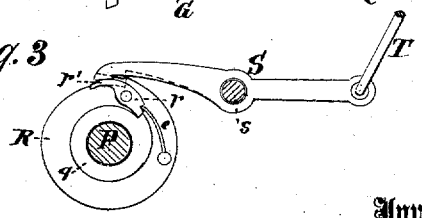

Figure 1 is a side elevation, partly broken away; Fig. 2, a top view. Figs. 3, 4, 5, and 6 are, respectively, detail views of mechanism, choppers, sweep, and the plow that does the second working.

In the drawing, A represents the frame of a cotton-cultivator and plant-thinner; and B, the wheels made fast to the axle C. D is a flat U-shaped bar, made of any suitable material, hinged to the under side of frame A at *a a*, and held in front to the bar E, at various elevations, by an adjustable screw-bolt, F, to regulate depth of cultivator-plows. On the under side of the flat bar D are bearings *d d*, in which the axle turns. G G are cultivator-plows, which are used at the first working of the cotton-crop; H, a plow employed at the second working; and I, a double-sweep plow used in the last operation of "laying by" the crop. These are all successively bolted or otherwise applied to the projecting plate *j* of the standard J, which is preferably made in the same piece with the bottom curved and concaved chopper-bar J′. The plow I is run on each side, and then through the middle of space between the rows, so as to pulverize all the soil, and the plants hilled up more or less. K K K represent three horizontal chopping-knives, attached at intervals around a cutter-stock, L, which is adjustable, by means of its sleeve *l*, upon the vertical shaft M. The shaft M has a bevel-pinion, N, which gears with bevel-wheel O on a shaft, P. This shaft is provided with a loose pulley, Q, having the notched side flange *q*, and a fast disk or wheel, R, having the spring-pressed lever-pawl *r* on its side, and the notch *r′* on its periphery. S is a lever, pivoted about midway of its length on a shaft, *s*, and moved by a rod, T, extending back between the handles U U, and within easy reach of the plowman. V is a drive-chain, which is moved by the pulley Y on axle C. As the cultivator moves forward, the notch of the pulley catches against the down-pressed end of pawl *r*, and carries around the disk R, and with it the shaft P, which rotates the choppers. If it is desired to throw the choppers out of gear with their operative mechanism, the rod T is pulled by the workman, and the free end of lever S brought to bear on the rear of pawl *r*. This has the effect of lifting the front end of the pawl out of and above the notch and pulley, so that the latter revolves loosely around the shaft P. By arranging around the stock L horizontal radial knives K K K at suitable distances apart, with a larger space between two of the knives of each set than between the others, the said knives may rotate continuously, so as to leave uncut a portion of the plants, and to cut out the intermediate space. The end of lever S is made broad enough to extend over the disk R, and catch upon its notch *r′*, so as to lock the choppers in the proper position, and leave plants standing where no thinning may be required. The horizontal knives being moved forward at the same time that they are rotated, will move through the ground, cutting up the plants and weeding off the grass about a quarter of an inch below the level of the ground, and leaving hills of plants at regular intervals. Z represents the clevis-rod, which is adjustable in the holes *z z z*, so that the horse or horses may always be enabled to walk to one side of plants, while the machine can run immediately over the row without injury to the plants by the horses.

Having thus described my invention, what I claim as new, and desire to secure by Letters Patent, is—

1. The hinged U-shaped bar D, combined with frame A, axle C, and draft-bar E, as and for the purposes described.

2. One or more sets of horizontal chopping-knives, K K K, arranged and applied as and for the purpose set forth.

3. The standards J J′ M, combined and relatively arranged to receive plows and horizontal choppers, as and for the purpose described.

4. The loose pulley Q, having notched side flange *q*, the disk R, having notch *r′* and pawl *r*, the lever *s* and the rod T combined with shaft P, as and for the purpose set forth.

JOSEPH B. UNDERWOOD.

Witnesses:

A. McPHERSON, Jr.,
JNO. W. HINSDALE,
J. B. McRAE.